United States Patent
Le Roux et al.

(10) Patent No.: US 6,216,955 B1
(45) Date of Patent: Apr. 17, 2001

(54) SMART CARD WITH PARTIAL INSERTION AND IDENTIFYING MEANS

(75) Inventors: Jean Yves Le Roux; Christophe Genevois, both of Nice (FR)

(73) Assignee: SCM Schneider Microsysteme-Microsystemes, Schneider Entwicklungs und Vertriers GmbH S.A.R.L. Developpement et Vente, La Ciotat (FR)

(*) Notice: Subject to any disclaimer, the term of this patent is extended or adjusted under 35 U.S.C. 154(b) by 0 days.

(21) Appl. No.: 09/445,394

(22) PCT Filed: Jun. 2, 1998

(86) PCT No.: PCT/FR98/01099

§ 371 Date: Dec. 6, 1999

§ 102(e) Date: Dec. 6, 1999

(87) PCT Pub. No.: WO98/55969

PCT Pub. Date: Dec. 10, 1998

(30) Foreign Application Priority Data

Jun. 5, 1997 (FR) .................................. 97 07092

(51) Int. Cl.[7] .................................. G06K 19/06

(52) U.S. Cl. .............................. 235/492; 235/487
(58) Field of Search .................... 235/492, 487

(56) References Cited

U.S. PATENT DOCUMENTS 4,864,115   9/1989   Imran et al. .

FOREIGN PATENT DOCUMENTS

| 0 552 078 | 7/1993 | (EP) . |
| 0 696 010 | 2/1996 | (EP) . |
| 2 615 984 | 12/1988 | (FR) . |
| 2 661 762 | 11/1991 | (FR) . |
| 2 189 741 | 11/1987 | (GB) . |
| 61-143892 | 7/1986 | (JP) . |
| WO 92/22043 | 12/1992 | (WO) . |

*Primary Examiner*—Harold I. Pitts
(74) *Attorney, Agent, or Firm*—Young & Thompson

(57) ABSTRACT

An electronic smart card adapted to be inserted into a PCMCIA interface or other smart card reader and an interface adapted to be plugged into a card reader and including at least one recess whose dimensions permit only a partial insertion of the smart card, where that portion of the smart card which cannot be inserted into the PCMCIA interface or the like includes at least one recognition device.

12 Claims, 4 Drawing Sheets

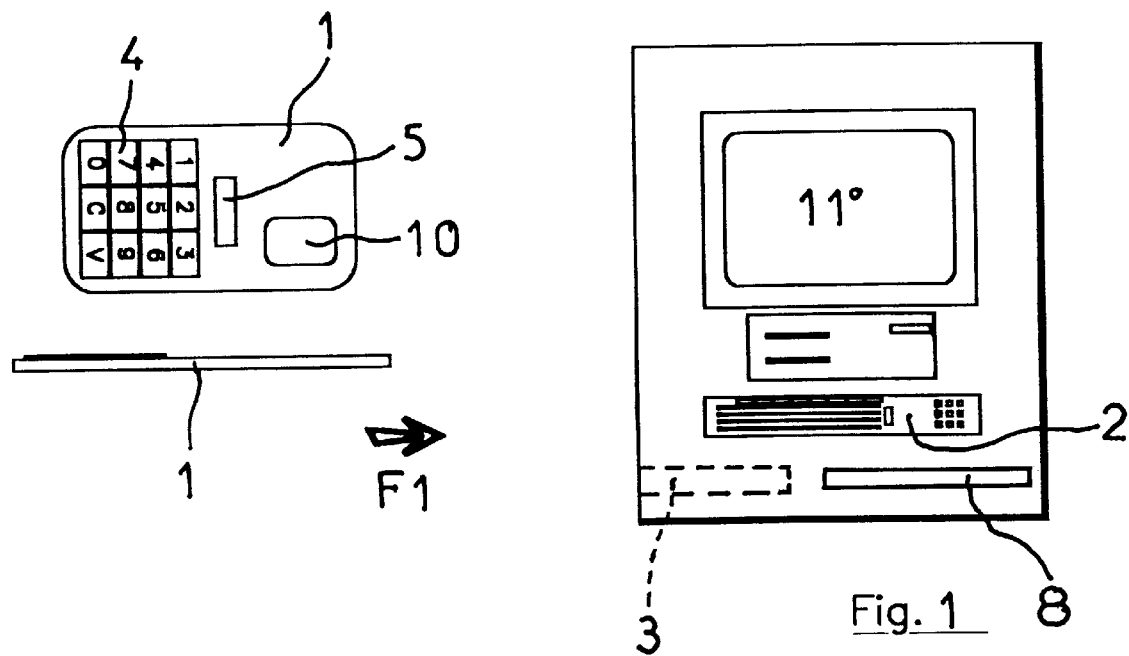
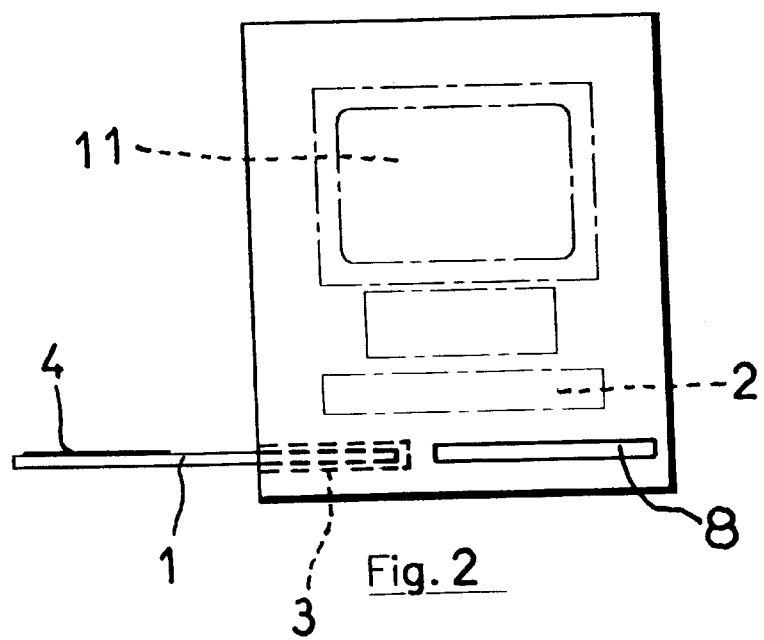

SMART CARD WITH PARTIAL INSERTION AND IDENTIFYING MEANS

The present invention relates to an electronic smart card adapted to be emplaced in a PCMCIA interface, provided for this purpose, the interface being adapted to be plugged into a card reader and comprising at least one recess, whose dimensions permit only partial nsertion of the smart card.

The state of the art can be defined by FR-A-2.664.724, which has for its object an electrical connector which is adapted to receive a miemory card of flat shape, containing an electronic circuit and carrying, on one of its large surfaces, ohmic contacts which, during use of the card, are electrically connected with supplemental contacts provided on the connector. To permit the detection of false cards, the connector comprises a detector for detection of the electromagnetic field, disposed in a region comprised between an entry slot for the card in the connector and the place occupied by the electronic circuit of the card in the connector when the card occupies the position in which its ohmic contacts are in contact with the contacts of the connector.

This document defines the conventional usage which is made of a smart card. This card comprises moreover within it, recognition means, which implies that the card must be completely inserted so that these means have an effect and that the reader or the like receiving this card will be provided with means adapted to take account of these recognition means. This is absolutely not the case of the present invention, in which the smart card is inserted only partially in the reader.

FR-A-2.696.032 provides a device to carry out monetary transactions with microprocessor cards such as bank cards which comprise, in a housing, a coupler for the card with a microprocessor, a slot located in line with the coupler for the partial introduction of a microprocessor card, a keyboard for entering at least one confidential code associated with a card introduced into the coupler, a means to process and validate the transaction.

In this case, the card is partially inserted into the housing, nevertheless the use of said card requires the input of a confidential code at the level of said housing, which does not guarantee absolute safety.

EP-A-0 696 010 relates to a portable interface for one or several electronic smart cards, the interface beiag adapted to be plugged into a card reader, comprised by a module, adapted to be disposed in the card reader and comprising at one end means adapted to be plugged into electrical connection with the card reader, a ferrule secured to the other end of the module comprising a slot to introduce the smart card, a recess adapted to receive at least partially the smart card and passing through at least a portion of said ferrule, said recess comprising guide means and positioning means for the smart card, and electrical connection means with areas of electrical contact of the smart card.

The problem with this document is identical to that raised in connection with the preceding document. The input of a confidential code into a keyboard external to the card can be easily penetrated by technology, unless this operation takes place in a secured location, which is rarely the case.

The present invention provides for solving this problem by permitting an identification of the card itself without indication of the confidential code passing through the central unit of the computer.

There is also known FR-A-2.661.762 which relates to a process and device for transaction between at least one data support adapted to be plugged in, with a microcircuit, at least one first data support that can be plugged into a microcircuit and at least one second data support through an interface circuit. The first data support is a microcircuit support which contains all the data for identification, control and management of the interface circuit and of the transaction.

The first data support is of complicated structure which integrates a memory and means for analyzing data.

There is also known from FR-A-2.615.984 a smart card comprising a memory to reserve programs and data, and having a microphone and a loudspeaker. The words corresponding to the data or to a command are converted into a signal by the microphone. These,signals can be directed toward an outlet terminal of the card under control of the latter or alternatively, the card can preserve and analyze the voice and give corresponding control signals or numerical data.

The provided smart card has a very particular application and comprises a memory and means for analyzing data, thereby forming a complex card.

WO92/22043 has an intelligent transportable terminal which permits transmitting to a data receiver the data from a data generator, subjected, as the case may be, to supplemental processing. The transmission of the data in a receiving apparatus can take place at a moment and at a place different from those for the introduction of the data. The terminal is preferably provided with interfaces with devices for coupling that cannot be worn out and preferably comprises a protection against reading or unauthorized reading or unauthorized introduction of data into the terminal. Developments of the invention comprise a structure that can be encased in the cavity of the ashtray of a vehicle and means for transmission for induction of the supply energy, as well as means for coupling to data transfer terminals.

The proposed structure to avoid unauthorized data reading is not in the smart card format and is hence unadaptable to coact with a smart card reader.

The invention relates to an electronic smart card adapted to be emplaced in a PCMCIA interface or other reader, provided for this purpose, the interface being adapted to be plugged into a card reader and comprising at least one recess, whose dimensions permit only a partial insertion of the smart card, characterized by the fact that the portion of the smart card, which cannot be inserted into the PCMCIA interface or the like, comprises at least one recognition means.

The recognition means is carried by one of the surfaces of the smart card.

The recognition means is constituted by a keyboard.

The recognition means is constituted by a voice recognition.

The portion of the smart card that is not inserted comprises a display to validate the recognition.

According to a modified embodiment, the card operates with one interface with two recesses, the dimensions of the other recess permitting a total or partial insertion of another smart card, characterized by the fact that the partially insertable card is provided with the validation of the operation or operations to which the totally or partially insertable card is subject.

The data from the partially inserted card moving toward the totally or partially inserted card passes via the imicroprocessor of the PCMCIA interface or the like without transmission to other electronic equipment.

Each button of the keyboard is in connection with two of the regions of electrical contact of the electrical connection means.

Each button in connection with two regions of electrical contact, one disposed on the abscissa and the other on the ordinate, said button corresponding to the intersection of the two regions.

The accompanying drawings are given by way of indicative example and are not limiting. They show two preferred embodiments according to the invention. They permit easy comprehension of the invention.

FIG. 1 shows an overall view of a microcomputer provided with a PCMCIA interface according to a first embodiment before insertion of a smart card according to the invention, the card being represented in a view from below and in side profile.

FIG. 2 is a view identical to FIG. 1 after insertion of the card.

Figure 6:
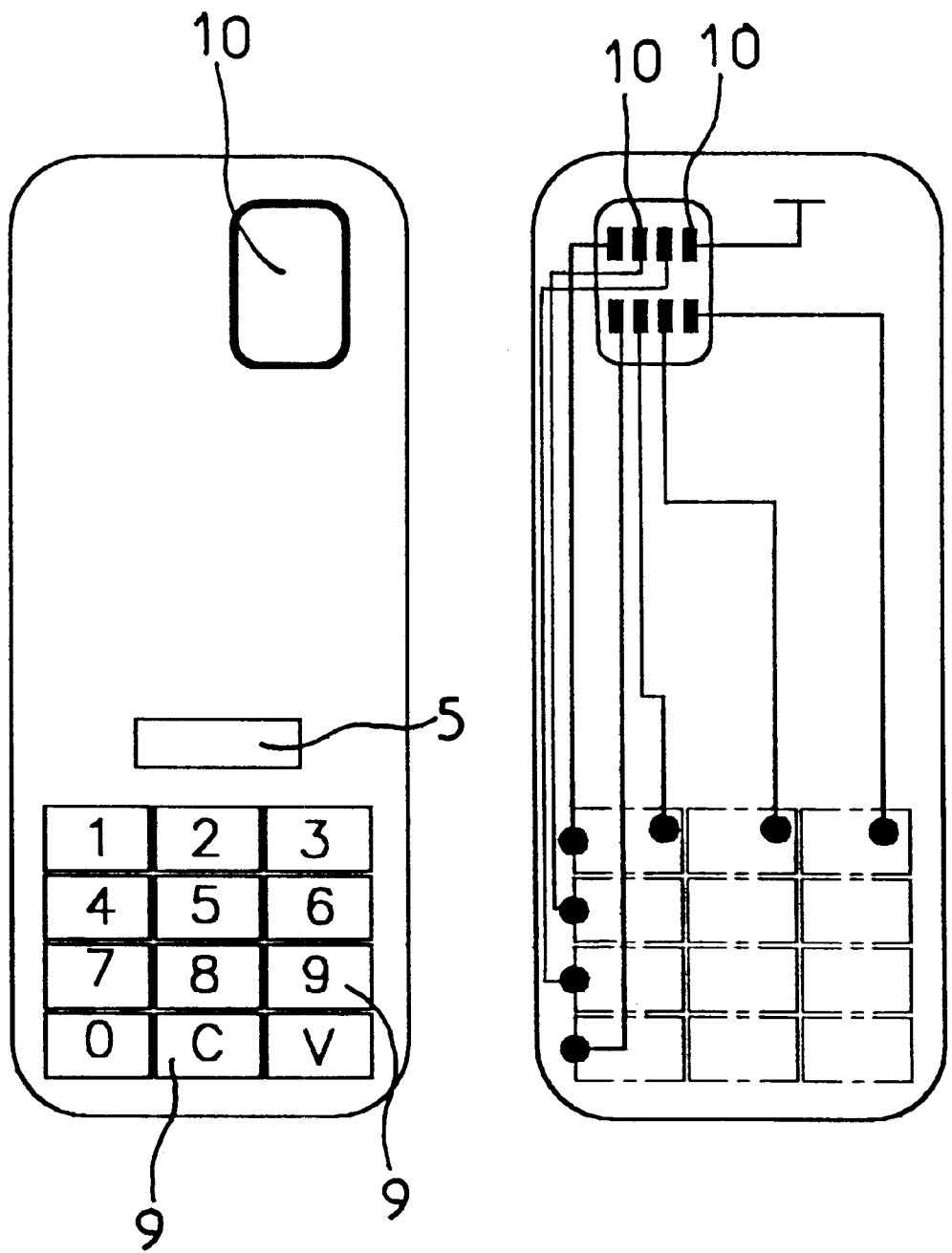

Finally,

FIG. 6 shows a front view and a longitudinal cross-sectional view of a smart card according to a second embodiment of the invention.

Figure 5:
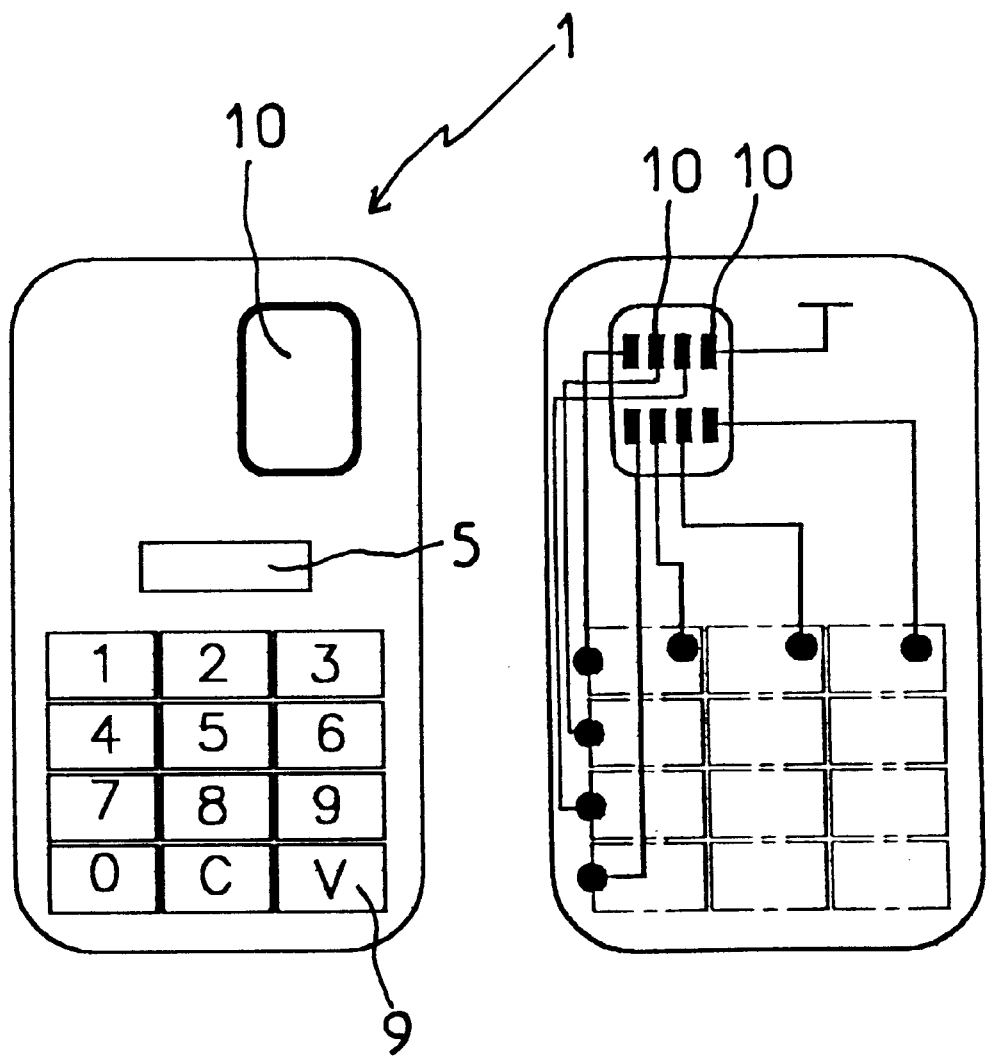
FIG. 5 shows a front view and a longitudinal cross-sectional view of a smart card according to a first embodiment of the invention.

The present invention relates to an electronic smart card 1 shown in FIGS. 5 and 6 according to two embodiments.

This smart card comprises in an entirely conventional way an electronic chip, not shown in the figures, which is associated with electrical contact regions 10.

As is seen in the left-hand views, which is to say the external views, each card one can also comprise a recognition means 4 which is constituted in the drawings by a keyboard with 12 keys 9.

Ten keys 9 are numerical whilst two keys 9 are validation or correction keys.

Each key 9 is in direct connection with two electronic contact regions 10.

Nevertheless, it is possible that the connection be indirect. In this case a chip is placed between the keyboard and the two regions 10.

Because the number of regions 10 is less than the number of keys, eight instead of twelve, each key 9 of the keyboard 4 is associated with two region 10, as is shown in the right-hand figures in longitudinal cross-sectional views.

It will be noted that according to this embodiment, seven regions 10 are devoted to the recognition of keys 9, whilst the last region 10 is devoted to electrical supply.

The seven regions 10 are arranged in the following manner.

Three regions 10 are devoted to the abscissae and four regions 10 are devoted to the ordinates, such that there exists between the regions 10 devoted to the abscissae and those devoted to the ordinates, twelve points of intersection, each point of intersection corresponding to a key 9.

In the drawings, it will also be noted that it is possible to have a display 5 which permits the operator to visualize the code that he puts in or to visualize whether the code has been validated or is correct or false.

Of course, the presence of the keyboard 4 creates an extra thickness, as is seen in FIGS. 1 to 4.

Figure 4:
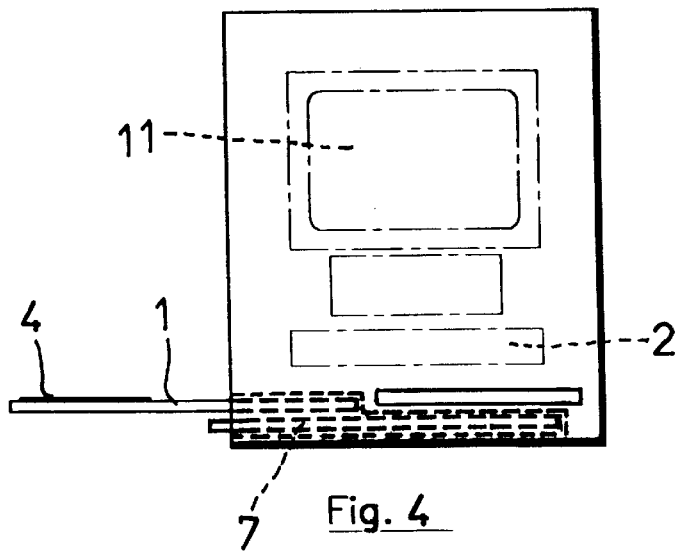
FIG. 4 is a view identical to FIG. 3 after insertion of the two cards.

The smart card 1 according to the present invention is therefore adapted to be partially plugged in in the direction of the arrow F1 as is shown in FIGS. 2 and 4.

Figure 3:
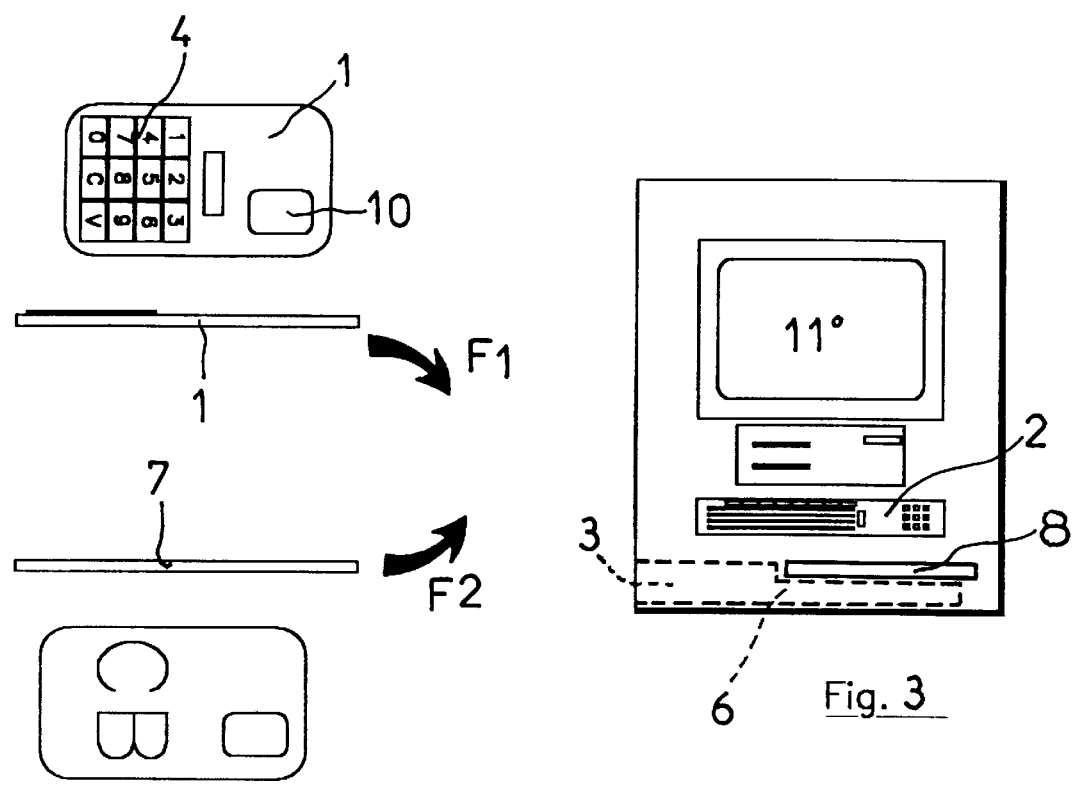
FIG. 3 shows an overall view of a microcomputer provided with a PCMCIA interface according to a second embodiment before insertion of two smart cards, one according to the invention, the other conventional, the two cards being shown in bottom and side profile views.

This emplacement in the direction of arrow F1 takes place at the level of a recess 3 shown in FIGS. 1 and 3.

The assembly operates by means of a microprocessor 8.

Of course, in these figures, the computer is shown entirely symbolically.

The card reader 2 is in fact located in the central unit and receives the interface PCMCIA devoted to the reception of the smart card 1.

Again according to the PCMCIA format, it is also possible to insert a second smart card 7, as is shown in FIGS. 3 and 4.

This second smart card 7 is inserted in the direction of arrow F2 at the level of a recess 6, this insertion is total.

It can be for example a bank card.

Because of this, in a preferred use, there could be simultaneously or successively inserted two smart cards 1 and 7 in the direction of the arrows F1 and F2, to permit the transfer of money from the bank card 7 toward the computer 11, following a validation by the smart card 1 by means of its keyboard 4.

Of course, in the same manner as in FIGS. 1 and 2, the assembly of the device is controlled by a microprocessor 8.

In this case, the validation of the code takes place at the level of the smart card 1 and will permit controlling the order of debit or if desired of credit from the other smart card 7 via the microprocessor 8.

The code will accordingly not be divulged at the level of the central unit of the microprocessor 11, which permits avoiding pirating the code and thus unauthorized charges on the bank card 7.

REFERENCES

1. Smart card
2. Card reader
3. Recess
4. Recognition means or keyboard
5. Display
6. Other recess
7. Other smart card
8. Microprocessor
9. Keys of keyboard 4
10. Regions of electrical contact
11. Computer
F1. Insertion of the card 1 in the recess 3
F2. Insertion of the card 7 in the recess 6

What is claimed is:

1. An electronic smart card (1) adapted to be inserted into a PCMCIA interface or other reader provided for this purpose, the interface being insertable in a card reader (2) and comprising at least one recess (3 or 6), the interface having dimensions which permit only the partial insertion of the smart card (1), a portion of the smart card (1), which cannot be inserted in the interface, comprising at least one recognition means (4) carried by one of the surfaces of the smart card (1) and constituted by a keyboard (4), and a portion of said smart card (1) which is inserted in the interface comprising connection means with said interface, in the form of electrical contact areas (10), wherein each key (9) of the keyboard (4) is in direct electrical connection with two of the electrical contact areas (10) defining the abscissa and the ordinate of the key (9).

2. Card according to claim 1, wherein the noninserted portion of the smart card (1) comprises a display (5) to validate the recognition.

3. Card according to claim 1, which operates with an interface having two recesses (3 and 6), the dimensions one of the two recess (6) permitting a total insertion of another smart card (7), wherein the smart card (1) that is partially inserted is devoted to the validation of the operation or operations to which the another smart card (7) that can be totally inserted is devoted.

4. Card according to claim 3, wherein the information from the smart card (1) that can be partially inserted, toward the another smart card (7), passes via a microprocessor (8) of the interface without transmission toward other electronic equipment.

5. An electronic smart card system, comprising:

a station having a smart card interface, and a smart card reader operatively connected to said smart card interface; and a first electronic smart card adapted to be inserted into the smart card interface of said station, said smart card interface having a first recess whose dimensions permit only partial insertion of said first smart card, a portion of said first smart card which is inserted into said smart card interface having plural electrical contact regions, a portion of said first smart card which cannot be inserted into the smart card interface comprising a keyboard recognition means comprising a keyboard located on a surface of said first smart card, said keyboard having plural keys, each of the plural keys being electrically connected with two of the electrical contact regions, one of the two electrical contact regions to which each of the plural keys are connected being an abscissa contact and the other of the two electrical contact regions to which each of the plural keys are connected be an ordinate contact so that each of the plural keys correspond to an intersection of one abscissa and one ordinate.

6. The system of claim 5, wherein said first smart card further comprises a display operatively connected to said keyboard.

7. The system of claim 5, wherein the keyboard recognition means further comprises a vocal recognition means.

8. The system of claim 5, wherein said smart card interface comprises a second recess which permits insertion of a second smart card, said first smart card (1) being a validation card of an operation performed on said second smart card.

9. The system of claim 8, wherein said station further comprises a microprocessor arranged to receive information from said first smart card and move the information to said second smart card without transmission toward other electronic equipment.

10. The system of claim 5, wherein said keyboard comprises twelve keys, ten of the twelve keys being single-digit keys, one of the twelve keys being a clear key, and one of the twelve keys being a validation key.

11. The system of claim 10, wherein said twelve keys are connected to only seven of said electrical contact regions.

12. The system of claim 11, wherein said electrical contact regions number exactly eight, and one of said eight electrical contact regions is a power contact.

* * * * *